United States Patent [19]

Seron

[11] Patent Number: 4,790,646
[45] Date of Patent: Dec. 13, 1988

[54] EYEGLASS HOLDER

[75] Inventor: Suren V. Seron, Joliet, Ill.

[73] Assignee: Seron Manufacturing Company, Joliet, Ill.

[21] Appl. No.: 571,680

[22] Filed: Jan. 18, 1984

[51] Int. Cl.$^4$ ............................................. G02C 3/00
[52] U.S. Cl. .................................. 351/156; 351/123; 351/157
[58] Field of Search ............... 351/123, 155, 156, 157, 351/144, 147

[56] References Cited

U.S. PATENT DOCUMENTS

| | | | |
|---|---|---|---|
| 1,170,197 | 2/1916 | Styll et al. | 351/144 |
| 2,819,650 | 1/1958 | Seron | 351/157 |
| 3,879,804 | 4/1975 | Lawrence | 351/157 |
| 3,979,795 | 9/1976 | Seron | 351/157 |
| 4,136,934 | 1/1979 | Seron | 351/157 |

Primary Examiner—John K. Corbin
Assistant Examiner—Paul M. Dzierzynski
Attorney, Agent, or Firm—Wood, Dalton, Phillips, Mason & Rowe

[57] ABSTRACT

An eyeglass holder including a temple receiving fixture formed of a body of elastomer and having an elongated slot through which the temple of an eyeglass may be passed along with a long narrow recess. An elongated strap having a long narrow cross sectional shape approximating that of the recess has an end disposed in the recess and is bonded to the recess by a bond therein. The invention contemplates that the bond may comprise an adhesive or a solvent weld.

8 Claims, 1 Drawing Sheet

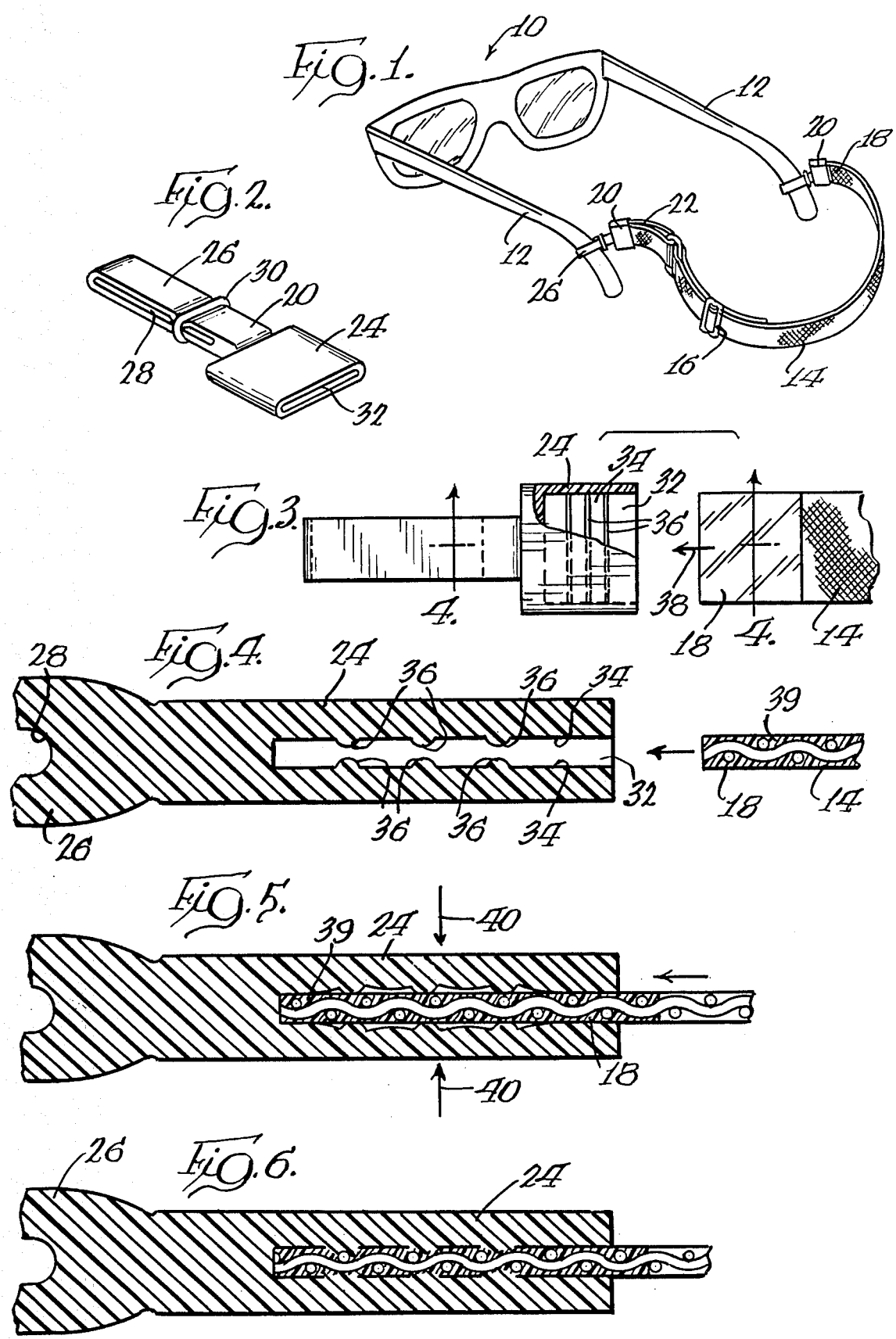

EYEGLASS HOLDER

FIELD OF THE INVENTION

This invention relates to eyeglass holders, and more particularly, to improved eyeglass temple receiving and holding fixtures used in eyeglass holders.

BACKGROUND OF THE INVENTION

Prior art of possible relevance includes U.S. Pat. No. 2,819,650 issued Jan. 14, 1958 to S. M. Seron and U.S. Pat. Nos. 3,979,795 and 4,136,934 issued Sept. 14, 1976 and Jan. 30, 1979 respectively to S. V. Seron.

Eyeglass holders of the sort exemplified by the above identified patents have proved to be extremely successful. The holders, in the case of those illustrated in the '650 and '934 patents, are ideally suited for assuring that eyeglasses will not become disassociated from the wearer during the activities of the wearer, even in athletic contest.

Eyeglass holders of the type exemplified by the '795 patent have also proved successful in that wearers of eyeglasses using such holders may remove the eyeglasses and allow them to hang from their neck by the strap employed.

In the case of the former type of eyeglass holder, an elastic strap is employed while in the case of the latter, generally, a decorative flexible, but non-elastic strap will be utilized.

In the case of each type, there is provided a temple receiving fixture, typically formed of an elastomer, and provided with an elongated slot. The effective length of the slot can be varied through the use of a metal slider so that the slot can be firmly and resiliently closed about the temple of an eyeglass passed therethrough. In the case of each, it is necessary to provide some means as a snap connector or a ferrule for securing the temple receiving fixture to the flexible strap or chain. The presence of this component adds some expense to the manufacturing cost of the eyeglass holder simply in terms of the cost of the part. It also tends to add to the manufacturing cost in terms of the increased labor that is required to assemble the ferrule or the snap fastener to the fixture and to the strap over the labor costs that would be present if such a ferrule or snap fastener was not required.

Thus, while eyeglass holders of the type mentioned worked extremely well for their intended purpose and have been quite successful over the years, it is desirable to reduce the cost of manufacture thereof.

SUMMARY OF THE INVENTION

The present invention is directed to overcoming one or more of the above problems, and specifically, directed to reducing the manufacturing costs of an eyeglass holder of the type identified previously.

An exemplary embodiment of the invention achieves the foregoing object in an eyeglass holder including a temple receiving fixture formed of a body of elastomer and having an elongated slot through which the temple of an eyeglass may be passed and a recess. An elongated strap having a cross sectional shape approximating that of the recess has an end disposed in the recess and bonding means are located in the recess to bond the strap end to the body.

In one form of the invention, the bonding means comprises an adhesive. In another form of the invention, the bonding means comprises a solvent weld.

In either case, the need for a separate fastener such as a ferrule or snap connector is avoided.

Preferably, the recess has an interior wall which includes a plurality of inwardly directed protuberances or ribs to facilitate the bond mentioned previously. In a highly preferred embodiment, the recess is long and narrow and the strap has a long and narrow cross sectional shape. The elastomer employed is a rubber-like elastomer and the end of the strap within the recess extends past the protuberances or ribs and opposite sides of the recess are pressed against the end of the strap.

Other objects and advantages will become apparent from the following specification taken in connection with the accompanying drawings.

DESCRIPTION OF THE DRAWINGS

FIG. 1 is a perspective view of an eyeglass holder made according to the invention disposed on a pair of glasses;

FIG. 2 is an enlarged, perspective view of the temple receiving fixture utilized in the invention;

FIG. 3 illustrates a step in the assembly of a strap forming part of the eyeglass holder to the fixture;

FIG. 4 is an enlarged sectional view taken approximately along the line 4—4 in FIG. 3;

FIG. 5 is a view similar to FIG. 4 but showing a subsequent step in the assembly; and FIG. 6 is a view similar to FIGS. 4 and 5 but showing the final assembly of the strap to the fixture.

DESCRIPTION OF THE PREFERRED EMBODIMENT

An exemplary embodiment of an eyeglass holder made according to the invention is illustrated in FIG. 1 in connection with a pair of eyeglasses, generally designated 10, having temples 12. The eyeglass holder consists of an elongated, flexible band or strap 14. The strap 14 may be elastic if intended to be used only for retaining the glasses on the head of the wearer. Conversely, if it is intended that the eyeglass holder permit the glasses to be removed from the head of the wearer to hang about the neck, a somewhat longer, non-elastic strap may be used.

Conventional means, including a buckle 16, may be provided for use in adjusting the length of the band 14.

One end 18 of the strap 14 is received in an eyeglass temple receiving and holding fixture 20. The opposite end 22 of the strap 14, consisting of a doubled over loop of material is likewise received in a fixture 20.

As seen in FIG. 2, each fixture 20 is defined by a body of elastomer. In a preferred embodiment, a rubber-like elastomer such as EPDM rubber may be used. The fixture 20 includes a base 24 from which an integral tail-like projection 26 extends. The projection 26 has an elongated slot 28 extending therethrough for receipt of a temple 12 of the eyeglass. A slidable, metal ring 30 compressively surrounds the projection 20 and may be moved along the length of the same to increase or decrease the effective size of the slot 28. In the usual case, the temple 12 will be inserted through the slot 28 and the fixture 20 stretched somewhat while the ring 30 is brought into substantial abutment with the temple 12.

The base 24 may be of any size or shape, the size or shape chosen being dependent only upon the dimensions of the strap 14 employed, and particularly, the cross sectional shape of the strap 14. As seen in FIG. 2, the end of the base 24 remote from the projection 26 includes a recess 32. In the embodiment illustrated, the recess 32 is long and narrow and conforms substantially to the cross sectional shape of either the end 18 or the doubled end 22 of the strap 14. As seen in FIGS. 3 and 4, the recess 32 has opposed interior walls 34 which in turn have integral, inwardly directed protuberances 36 thereon. As can be seen in FIG. 3, the protuberances 36 are in the form of elongated ribs. The end 18 of the strap (or the end 22 as the case may be) is introduced into the recess 32 in the direction of an arrow 38 and it will be observed from FIG. 3 that the direction of elongation of the ribs 36 is non-parallel to the direction of introduction of the end 18 or 22, and specifically is transverse thereto.

The strap 14 may be formed of woven or non-woven material and may or may not be elastic as mentioned previously. The end 18 or the end 22 is received within the recess 32 and bonded thereto to effect strong securement between the fixture 20 and the strap 14. The bonding may occur through the use of an adhesive or through the formation of a solvent weld, or a combination of both. As seen in FIG. 4, the end 18 of the strap 14 has been dipped in a small amount of material 39 suitable either as an adhesive, or as a solvent to form a solvent weld and then is inserted into the recess 32 as shown in FIG. 5. Thereafter, the walls of the recess are subjected to a pressing or squeezing force as indicated by arrows 40. As a consequence, a firm bond such as is illustrated in FIG. 6 is formed between the strap end 18 or 22 and the interior walls 34 of the recess 32 as shown in FIG. 6.

A preferred material for use as the material 39 is one sold by 3M Company as CA40 and characterized as a cyanoacrylate adhesive which actually cures in a very short period of time, a few seconds or less after application and insertion into the recess. Where the strap 14 may include some nylon, it is believed that not only is an adhesive bond formed, but a solvent welded bond as well. That is, the adhesive acts to dissolve a quantity of the rubber forming the fixture 20 and components of the band 14 such that the two merge during the pressing operation to form a weld when the adhesive cures.

The protuberances 36, when pressed into the strap 14, tend to act as rivets partially extending through the strap and thereby increase the shear strength of the union between the strap 14 and the fixture 20.

From the foregoing, it will be appreciated that an eyeglass holder made according to the invention eliminates entirely the need for fasteners such as ferrules, snap connectors or the like heretofore employed in joining temple receiving fixtures to the bands of eyeglass holders. It will also be appreciated that the assembly operation is extremely simple thereby minimizing labor requirements. As a consequence, an extremely effective, but economical to manufacture, eyeglass holder results.

I claim:

1. An eyeglass holder comprising
a temple receiving fixture formed of a body of elastomer to include a base with a projection extending therefrom and having an elongated slot extending through said projection through which the temple of an eyeglass may be passed and a recess in said base at an end thereof remote from said projection;
an elongated strap having a cross sectional shape approximating that of said recess and having an end disposed in said recess; and
bonding means in said recess bonding said end to said body, said bonding means comprising an adhesive.

2. The eyeglass holder of claim 1 wherein said recess has an interior wall and said body further including a plurality of inwardly directed ribs on said interior wall.

3. An eyeglass holder comprising
a temple receiving fixture formed of a body of elastomer to include a base with a projection extending therefrom and having an elongated slot extending through said projection through which the temple of an eyeglass may be passed and a recess in said base at an end thereof remote from said projection;
an elongated strap having a cross sectional shape approximating that of said recess and having an end disposed in said recess; and
bonding means in said recess bonding said end to said body, said bonding means comprising a solvent weld.

4. An eyeglass holder comprising
the temple receiving fixture formed of a body of elastomer and having an elongated slot through which the temple of an eyeglass may be passed and a long narrow recess, said recess having an interior wall provided with inwardly directed protuberances,
an elongated strap having a cross sectional shape approximating that of said recess and having an end disposed in said recess and extending past at least one protuberance; and
bonding means in said recess cooperating with said at least one protuberance and bonding said end to said body, said bonding means comprising an adhesive.

5. The eyeglass holder of claim 4 wherein said protuberance comprise ribs, said ribs being elongated in a direction non-parallel to the direction of entry of said strap into said recess.

6. An eyeglass holder comprising
a temple receiving fixture formed of a body of elastomer and having an elongated slot through which the temple of an eyeglass may be passed and a long narrow recess, said recess having an interior wall provided with inwardly directed protuberances,
an elongated strap having a cross sectional shape approximating that of said recess and having an end disposed in said recess and extending past at least one protuberance; and
bonding means in said recess cooperating with said a least one protuberance and bonding said end to said body, said bonding means comprising a solvent weld.

7. An eyeglass holder comprising
a temple receiving fixture formed of a body of rubber-like elastomer and having an elongated slot through which the temple of an eyeglass may be passed and a long narrow recess having a long, narrow cross sectional shape;
a flexible strap of woven material having a long, narrow cross sectional shape approximating that of said recess and having an end disposed in said recess;
opposed sides of said recess being pressed against said strap; and
bonding means in said recess bonding said end to said body, said bonding means comprising a cyanoacrylate compound.

8. The eyeglass holder of claim 7 wherein said body is formed to include a base with a tail-like projection extending therefrom and said elongated slot is located in said projection to extend therethrough, said recess being formed in said base at an end thereof remote from said projection, said recess having a bottom located in said base adjacent said projection.

* * * * *